United States Patent
Reynolds et al.

(10) Patent No.: US 8,100,333 B2
(45) Date of Patent: Jan. 24, 2012

(54) TRANSACTION PRODUCT WITH CAMERA

(75) Inventors: Adam W. Reynolds, Minneapolis, MN (US); Katherine L. Jackman, Seattle, WA (US); Jason Schultz, Farmington, MN (US); April A. Mueller, Minneapolis, MN (US); Timothy P. Clegg, Manhatten Beach, CA (US); Primoz Samardzija, Marina del Ray, CA (US)

(73) Assignee: Target Brands, Inc., Minneapolis, MN (US)

( * ) Notice: Subject to any disclaimer, the term of this patent is extended or adjusted under 35 U.S.C. 154(b) by 629 days.

(21) Appl. No.: 12/262,324

(22) Filed: Oct. 31, 2008

(65) Prior Publication Data

US 2010/0110274 A1    May 6, 2010

(51) Int. Cl.
*G06K 19/00* (2006.01)
(52) U.S. Cl. ..................................... 235/487
(58) Field of Classification Search .......... 235/487–492, 235/375, 379, 380, 381
See application file for complete search history.

(56) References Cited

U.S. PATENT DOCUMENTS

| | | | |
|---|---|---|---|
| 2,789,490 A | 4/1957 | Kaufman | |
| 3,490,171 A | 1/1970 | Crawford et al. | |
| 5,043,751 A | 8/1991 | Rice | |
| 5,488,445 A | 1/1996 | Oi et al. | |
| 5,933,659 A | 8/1999 | Glover et al. | |
| D434,981 S | 12/2000 | Shapiro | |
| 6,381,416 B2 | 4/2002 | Manico et al. | |
| 6,431,768 B1 | 8/2002 | Nakamura | |
| 6,497,519 B1 | 12/2002 | Mills | |
| 6,666,378 B2 | 12/2003 | Davila et al. | |
| 6,950,129 B1 | 9/2005 | Minne et al. | |
| 6,959,147 B2 | 10/2005 | Manico et al. | |
| 6,965,734 B2 | 11/2005 | Chan et al. | |
| D515,122 S | 2/2006 | Sakai | |
| 7,055,740 B1 | 6/2006 | Schultz et al. | |
| 7,126,629 B1 | 10/2006 | Braunstein et al. | |
| 7,252,225 B2 | 8/2007 | Schultz et al. | |
| D555,687 S | 11/2007 | Yoo et al. | |
| 7,290,714 B2 | 11/2007 | Halbur et al. | |
| 7,748,607 B2 * | 7/2010 | Borkowski et al. | 235/375 |
| 7,810,710 B2 * | 10/2010 | Halbur et al. | 235/375 |

(Continued)

OTHER PUBLICATIONS

Renyut, E.A. Joseph, "Digital camera producers face fierce competition," The Jakarta Post.com, http://www.thejakartapost.com/yesterdaydetail.asp?fileid=20050712.P01, Jan. 14, 2008, 3 pages.
U.S. Appl. No. 11/931,696, filed Oct. 31, 2007, entitled "Transaction Product With Memory."

(Continued)

*Primary Examiner* — Daniel Hess
(74) *Attorney, Agent, or Firm* — Griffiths & Seaton PLLC

(57) ABSTRACT

A transaction product includes a digital camera assembly, a housing and an account identifier. The digital camera assembly includes a lens assembly, an image sensor aligned with the lens assembly, and a memory electrically coupled with the image sensor. The digital camera assembly is configured to capture images through the lens assembly using the image sensor and to digitally store the captured images to the memory. The housing substantially encloses the image sensor and the memory. The account identifier links the transaction product to an account or record and is machine readable by a point-of-sale terminal such that value can be added to or deducted from the account or record using the account identifier. Other product, cards, assemblies and associated methods are also disclosed.

19 Claims, 12 Drawing Sheets

U.S. PATENT DOCUMENTS

| | | |
|---|---|---|
| 2001/0049895 A1 | 12/2001 | Burke |
| 2002/0143697 A1 | 10/2002 | Gotfried |
| 2002/0157974 A1 | 10/2002 | Krahn |
| 2003/0106935 A1 | 6/2003 | Burchette, Jr. |
| 2004/0036791 A1 | 2/2004 | Voss et al. |
| 2004/0046035 A1 | 3/2004 | Davila et al. |
| 2004/0182940 A1 | 9/2004 | Biller |
| 2006/0091202 A1 | 5/2006 | McInnis |
| 2006/0152601 A1 | 7/2006 | Parekh |
| 2007/0170263 A1 | 7/2007 | Waters |
| 2007/0290052 A1 | 12/2007 | Dean et al. |
| 2008/0119952 A1 | 5/2008 | Smith et al. |
| 2008/0223923 A1 | 9/2008 | Porvaznik et al. |
| 2009/0308920 A1 * | 12/2009 | Holt et al. .................... 235/379 |
| 2010/0155490 A1 * | 6/2010 | Halbur et al. ................ 235/487 |

OTHER PUBLICATIONS

U.S. Appl. No. 11/931,961, filed Oct. 31, 2007, entitled "Transaction Product With Generator."

U.S. Appl. No. 11/931,983, filed Oct. 31, 2007, entitled "Transaction Product With Electrical Circuit."

U.S. Appl. No. 11/965,480, filed Dec. 27, 2007, entitled "Transaction Product With Electrical Plug."

Wade, Will, "First Data Sees Sticker Device as Mobile-Pay Bridge," American Banker, Aug. 25, 2008, 2 pages.

"Contactless Payments: Consumer Trends and Usage Preferences," firstdata.com, 2008, 2 pages.

"Payment Processing: Mobile Commerce and the M-Wallet: A Market Brief," Retail Solutions Online, May 10, 2007, 2 pages.

* cited by examiner

TRANSACTION PRODUCT WITH CAMERA

BACKGROUND OF THE INVENTION

Stored-value cards and other transaction products come in many forms. A gift card, for example, is a type of stored-value card that includes pre-loaded or selectively loaded monetary value. In one example, a customer buys a gift card having a specified value for presentation as a gift for another person. In another example, a customer is offered a gift card as an incentive to make a purchase. A gift card, like other stored-value cards, can be "recharged" or "reloaded" at the direction of the bearer. The balance associated with the card declines as the card is used, encouraging repeat visits to the retailer or other provider issuing the card. Additionally, the card generally remains in the user's purse or wallet, serving as an advertisement or reminder to revisit the associated retailer. Transaction products provide a number of advantages to both the consumer and the retailer.

SUMMARY OF THE INVENTION

One aspect of the present invention relates to a transaction product including a digital camera assembly, a housing and an account identifier. The digital camera assembly includes a lens assembly, an image sensor aligned with the lens assembly, and a memory electrically coupled with the image sensor. The digital camera assembly is configured to capture images through the lens assembly using the image sensor and to digitally store the images to the memory. The housing substantially encloses the image sensor and the memory. The account identifier links the transaction product to an account or record and is machine readable by a point-of-sale terminal such that value can be added to or deducted from the account or record using the account identifier. Other related products, assemblies and methods are also disclosed and provide additional advantages.

BRIEF DESCRIPTION OF THE DRAWINGS

Embodiments of the invention will be described with respect to the figures, in which like reference numerals denote like elements, and in which.

DETAILED DESCRIPTION

A transaction product is adapted for making purchases of goods and/or services at, for example, a retail store or website and/or for storing non-monetary value adapted for redemption toward the use of goods and/or services (e.g., a phone card). According to one embodiment, an original consumer buys a transaction card in the form of a gift card to give a recipient who in turn is able to use the transaction product at a retail store or setting to pay for the goods and/or services.

A transaction product, according to embodiments of the present invention, provides the consumer and recipient with digital camera functionality in addition to the ability to pay for or use goods and/or services with the transaction product. In particular, in one embodiment, the transaction product includes a digital camera configured to capture image files and to be readily and selectively coupled with a personal computer or other suitable computing device to transfer image files thereto. As such, transaction products (e.g., gift cards and other stored-value cards, credit cards and debit cards) according to embodiments of the present invention function as a digital camera in addition to providing value available toward the purchase or use of goods and/or services.

Figure 8:
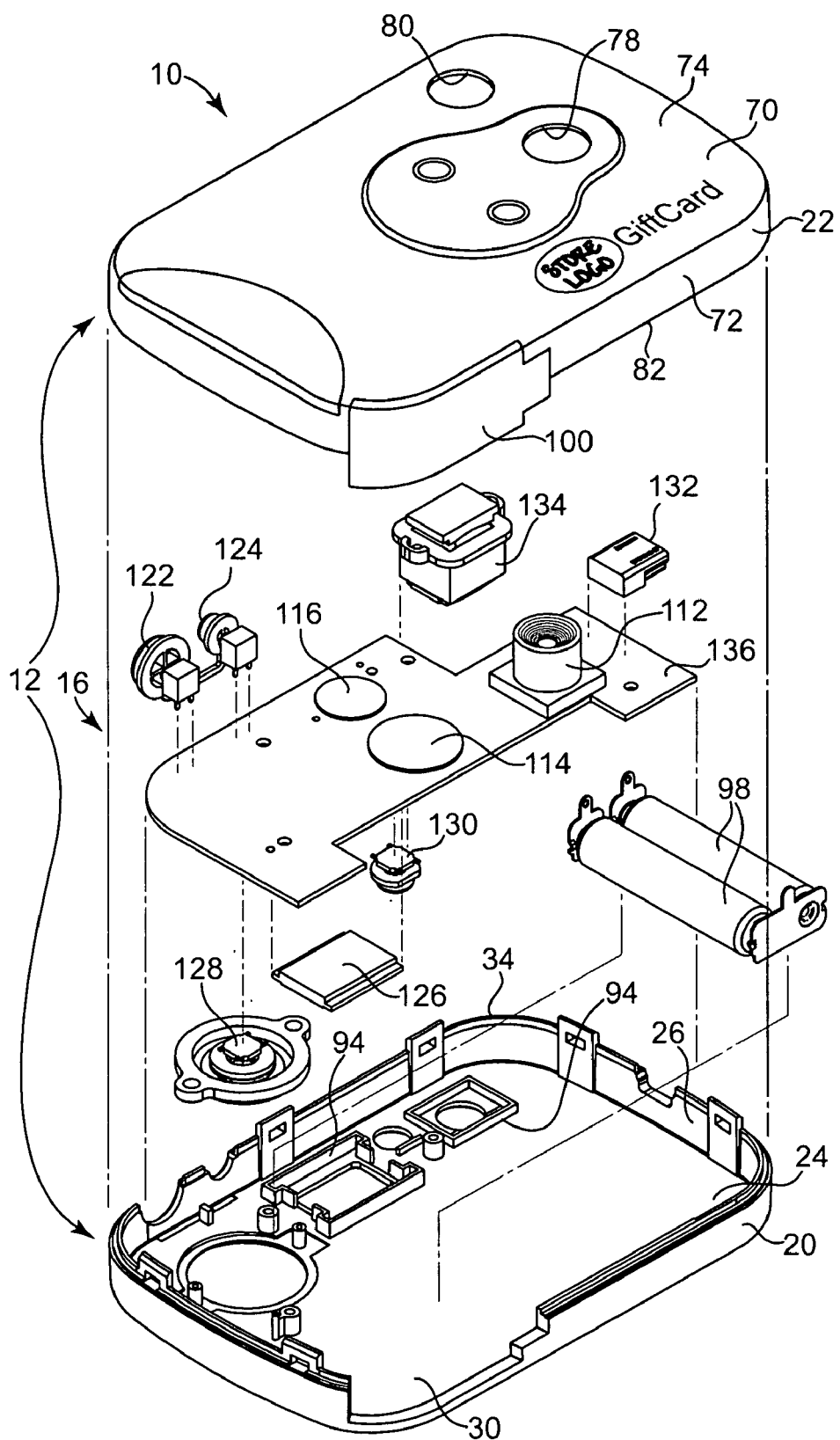
FIG. 8 is an exploded, top perspective view illustrating the transaction product of FIG. 1, according to one embodiment of the present invention.

Turning to the figures, FIGS. 1-7 illustrate various view of an assembled transaction product 10 (e.g., a stored-value card or financial transaction card) according to one embodiment of the present invention. FIG. 8 illustrates an exploded, top perspective view of transaction product 10 illustrated in FIGS. 1-7. Referring to FIGS. 1-8, in one embodiment, transaction product 10 includes an enclosure or housing 12, an account identifier 14 (or other activation area) and an electrical assembly or, more specifically, a digital camera assembly 16 as generally illustrated, for example, in FIG. 8, substantially enclosed within housing 12.

Account identifier 14 identifies or otherwise links transaction product 10 with an account or record and provides means for accessing the monetary funds or non-monetary funds (e.g., prepaid calling minutes or points) associated with the account or record for paying for goods and/or services, for use toward calling minutes, for use of points toward a purchase, etc. Referring to the bottom view of FIG. 3, housing 12 includes account identifier 14 coupled thereto and indicating an account or record linked with transaction product 10. Account identifier 14 indicates an account or record to which transaction product 10 is linked. The account or record maintains a monetary or non-monetary value or balance associated with transaction product 10 and is optionally stored on a database, other electronic or manual record-keeping system or in the case of "smart" cards for example, on a chip or other electronic device on transaction product 10 itself. Accordingly, by scanning or otherwise reading account identifier 14, the account or record linked to transaction product 10 is identified and can subsequently be activated and have amounts debited and/or added to the value associated therewith.

In one embodiment, account identifier 14 includes one or more of a bar code, magnetic strip, smart chip or other electronic device, radio frequency identification (RFID) device or other suitable marking readily readable by a point-of-sale terminal, account access station, kiosk or other suitable machine or device. In one embodiment, account identifier is coupled to (e.g., printed or adhered to), enclosed within or otherwise fixedly connected to housing 12. In one embodiment, account identifier 14 includes a printed character string or code 18 (e.g., a number and or letter string) configured to provide additional security to the use of transaction product 10 and/or configured to be read by a bearer of transaction product 10 to facilitate use of transaction product 10 for web site or other purchases outside of brick-and-mortar type retail establishments. With the above in mind, account identifier 14 is one example of means for linking transaction product 10 with an account or record, and scanning of account identifier 14 is one example of means for activating or loading value on transaction product 10 or at least a portion of such means.

In one embodiment, housing 12 includes a first housing member 20 and a second housing member 22 where, for example, first housing member 20 serves as a base, and second housing member 22 serves as a cover. Base 20 and cover 22 are configured to be coupled to one another and to at least partially house digital camera assembly 16 therebetween.

In one embodiment, base 20 generally includes a primary panel 24 and a side wall 26. In one example, primary panel 24 is generally rectangular in shape and is sized similar to that of an identification card, a credit card or other wallet-sized card. In particular, in one embodiment, primary panel is about 8.5 cm long and about 5.4 cm wide. In one example, the corners of primary panel 24 and side wall 26 are rounded or chamfered. In other embodiments, primary panel 24 is otherwise shaped as a square, circle, oval, star or any other suitable shape. Primary panel 24 defines a first or inside surface 30 (FIG. 9) and a second or outside generally planar surface 32 opposite inside surface 30.

Figure 1:
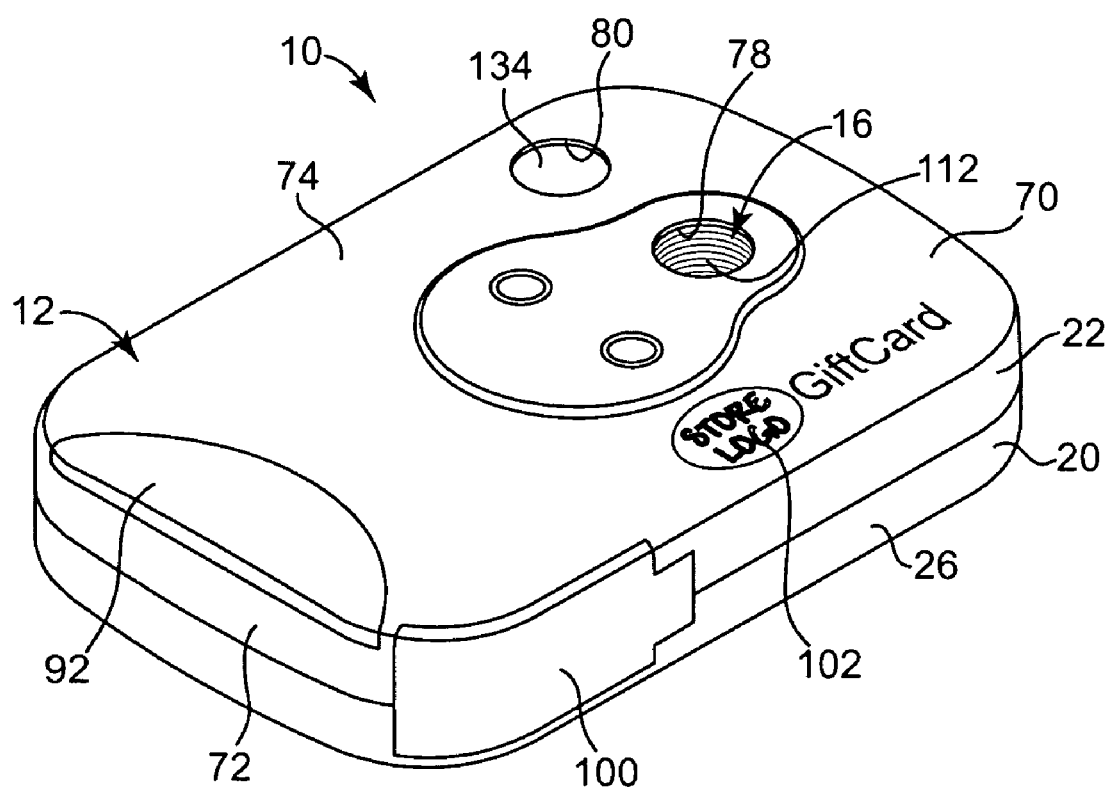
FIG. 1 is a perspective view illustrating a transaction product, according to one embodiment of the present invention.
Figure 2:
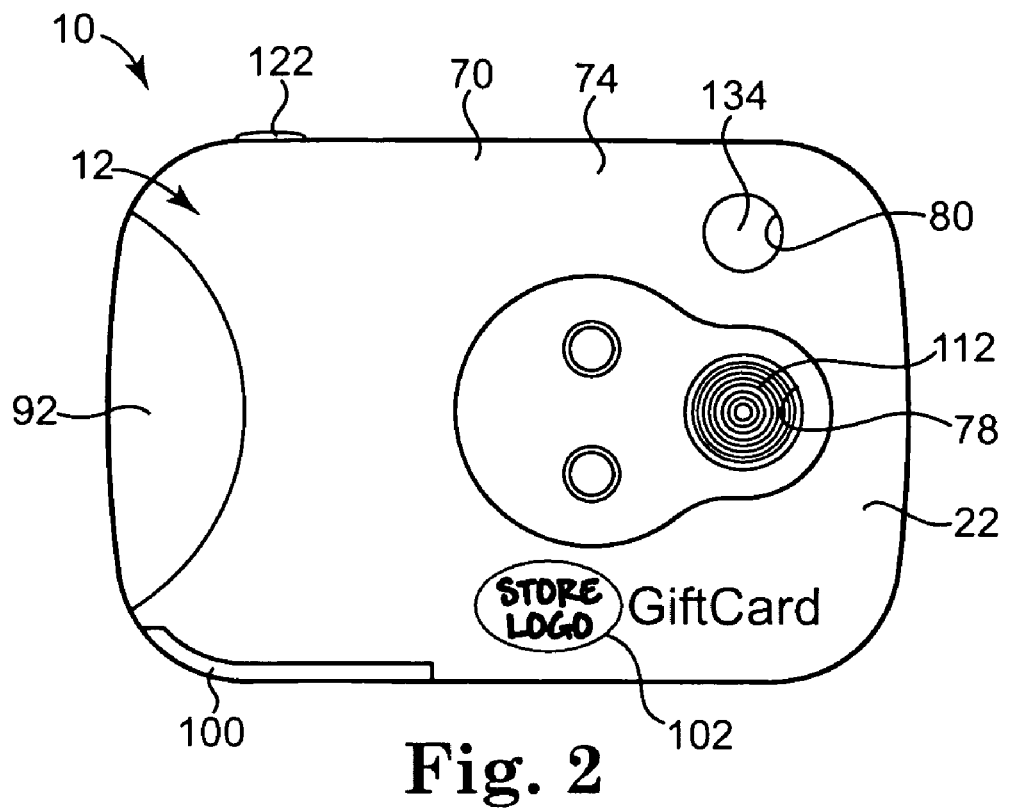
FIG. 2 is a top view illustrating the transaction product of FIG. 1, according to one embodiment of the present invention.
Figure 3:
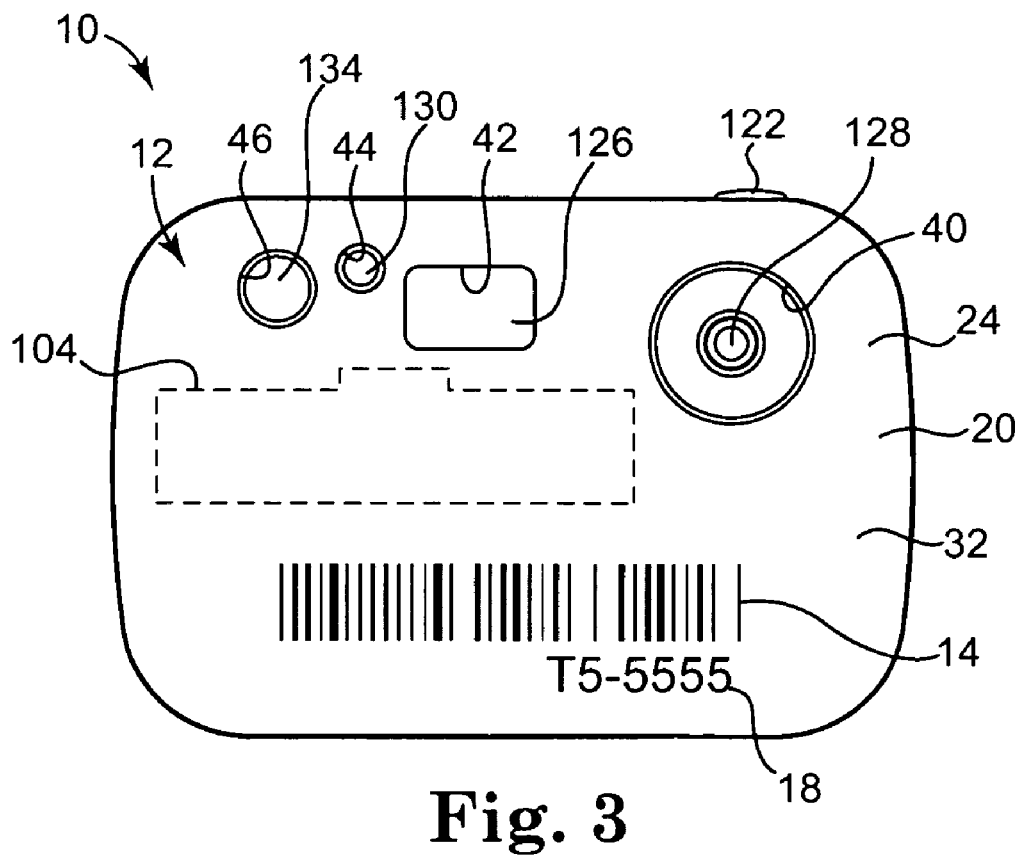
FIG. 3 is a bottom view illustrating the transaction product of FIG. 1, according to one embodiment of the present invention.
Figure 4:
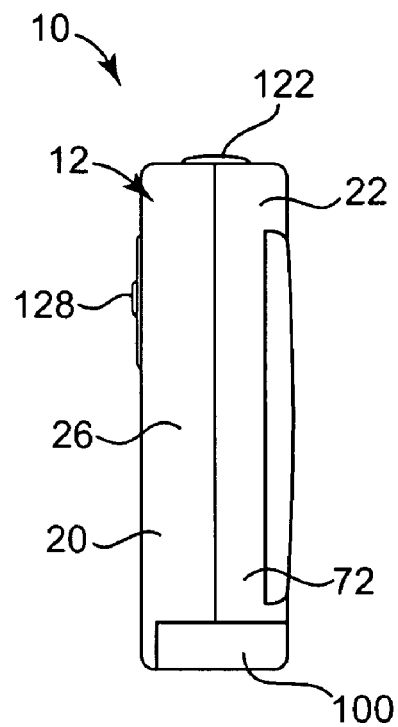
FIG. 4 is a left side view illustrating the transaction product of FIG. 1, according to one embodiment of the present invention.
Figure 5:
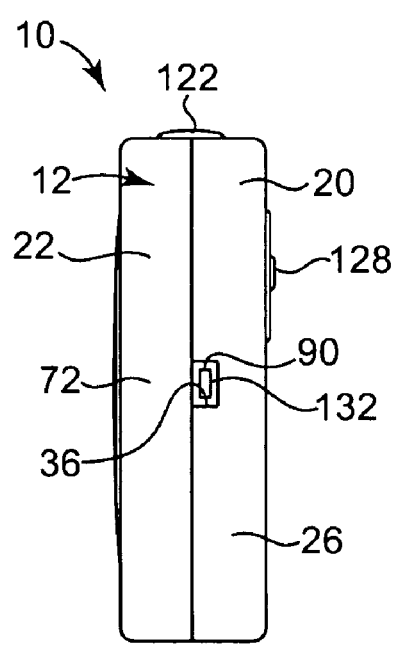
FIG. 5 is a right side view illustrating the transaction product of FIG. 1, according to one embodiment of the present invention.
Figure 6:
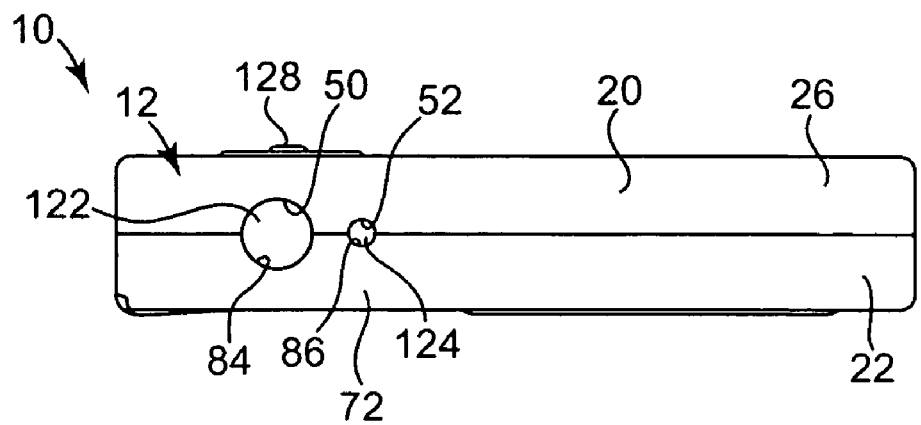
FIG. 6 is a rear view illustrating the transaction product of FIG. 1, according to one embodiment of the present invention.
Figure 7:
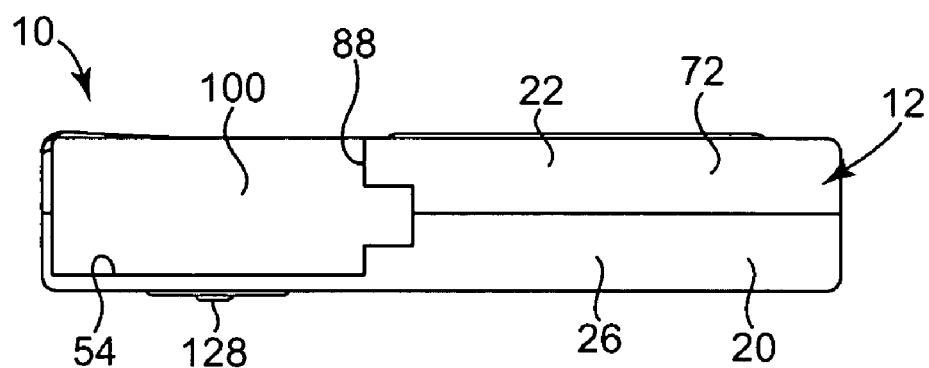
FIG. 7 is a front view illustrating the transaction product of FIG. 1, according to one embodiment of the present invention.
Figure 9:
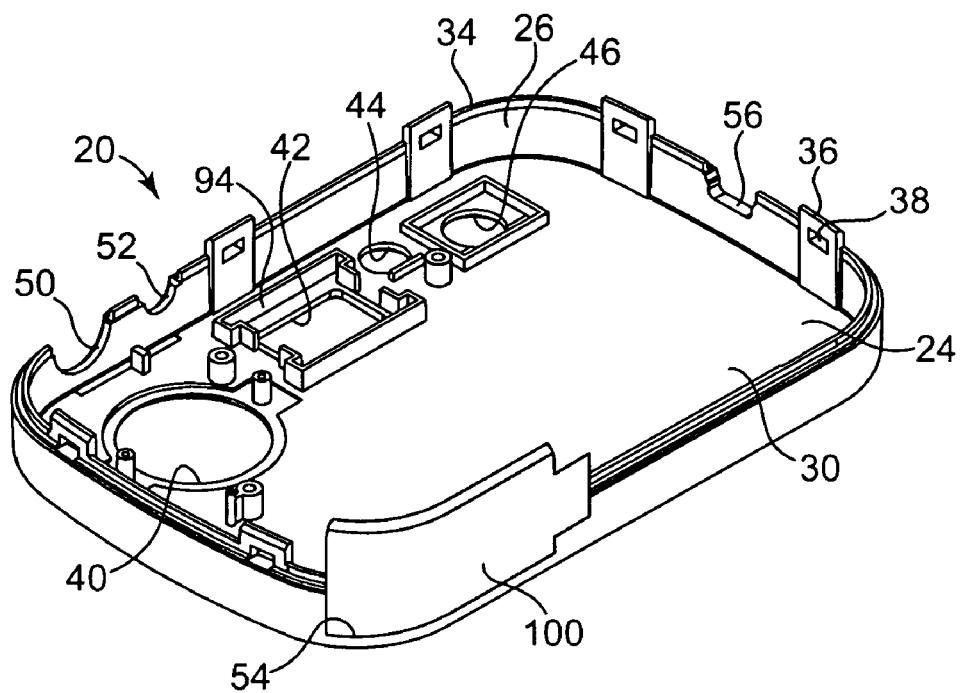
FIG. 9 is a top perspective view illustrating a base of the transaction product of FIG. 1, according to one embodiment of the present invention.

Additionally referring to FIG. 9, side wall 26 generally extends from inside surface 30 of primary panel 24 generally about the entire perimeter of primary panel 24 in a direction away from outside surface 32 (e.g., FIG. 3). In one example, side wall 26 extends from primary panel 24 with a generally perpendicular orientation. Accordingly, as illustrated in FIG. 9, side wall 26 defines an edge 34, for example, a stepped edge, opposite primary panel 24. In one example, protrusions 36 extend from inside surface 30 of primary panel 24 and/or from side wall 26 in a similar direction as side wall 26. Each protrusion 36 is configured to facilitate positioning and coupling of base 20 with cover 22 as will be further described below. In one embodiment, each protrusion 36 defines a slot or hole 38 on an end opposite primary panel 24.

In one embodiment, primary panel 24 defines openings or apertures 40, 42, 44 and 46, each positioned to align with a portion of digital camera assembly 16 and permitting access to the respective portions of digital camera assembly 16 through housing 12 as will be further described below. Cutouts 50, 52, 54 and 56 are formed in side wall 26 extending from edge 34 toward primary panel 24. Each cutout 50, 52, 54 and 56 is sized and positioned to at least partially receive various switches or other items of transaction product 10 as will be further described below.

Cover 22 generally includes a primary panel 70 and a side wall 72. Primary panel 70 is generally planar and defines an outside surface 74 and an inside surface 76 (FIG. 10) opposite outside surface 74 (e.g., FIG. 1). In one embodiment, primary panel 70 is of a size and shape generally similar to primary panel 24 of base 20. In one example, primary panel 70 defines at least two apertures 78 and 80 configured to receive or at least provide access to components of digital camera assembly 16 as will be further described below.

Figure 10:
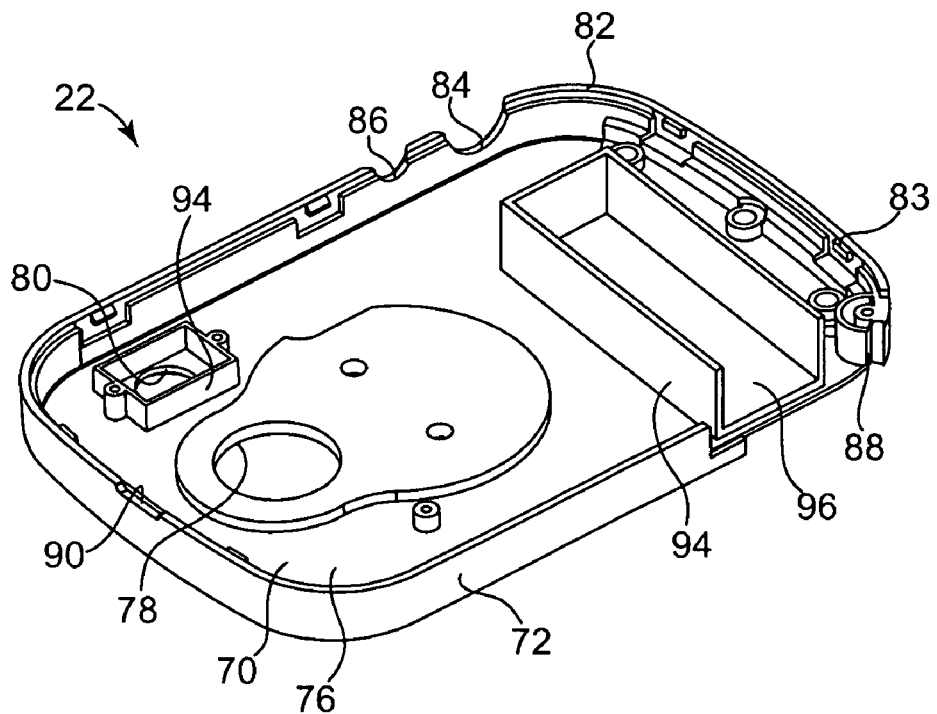
FIG. 10 is a bottom perspective view illustrating a cover and a door of the transaction product of FIG. 1, according to one embodiment of the present invention.

Referring to FIG. 10, side wall 72 extends from inside surface 76 of primary panel 70 away from outside surface 74 and generally about the entire perimeter of primary panel 70. More specifically, in one example, side wall 72 extends with a generally perpendicular orientation relative to primary panel 70. As such, side wall 72 extends from primary panel 70 to form an edge 82 opposite primary panel 70, for example, a stepped edge. Edge 82 is configured to interface and be coupled with edge 34 of base 20 when base 20 is coupled with cover 22. In one embodiment, friction or snap fit, adhesive, ultrasonic welding, and/or any other suitable technique may be used to couple base 20 to cover 22. In one example, one or more tabs 83 are formed near edge 82 and extend into cover 22. When base 20 and cover 22 are coupled to one another, each tab 83 is configured to fit within one of holes 38 formed by protrusions 36 of base 20 (FIG. 9) to facilitate alignment and coupling of base 20 and cover 22.

In one embodiment, one or more cutouts 84, 86, 88 and 90 are formed in side wall 72 and extend from edge 82 toward primary panel 70. Each cutout 84, 86, 88 and 90 is sized and positioned to at least partially receive various switches or other items of transaction product 10 as will be further described below. In one example, each cutout 84, 86, 88 and 90 is positioned to align with one of cutouts 50, 52, 54 and 56 when base 20 and cover 22 are coupled to one another (e.g., FIGS. 4-8).

In one embodiment, base 20 and cover 22 are each formed of a paper material, card stock material, plastic material, etc. In one example, each of base 20 and cover 22 are formed of by injection molding or otherwise forming plastic (e.g., polycarbonate, polystyrene, polyvinyl chloride (PVC), acrylonitrile butadiene styrene (ABS), polyethylene terephthalate (PET), teslin, polyactide (PLA) and acrylic) or other suitable material to define the various attributes of housing 12. Other materials and methods of forming base 20 and cover 22 are also contemplated.

In one embodiment, housing 12, for example, cover 22, includes a grip 92 on an outside surface thereof. In one example, grip 92 is provided in the form of ridges or other features formed on housing 12. In one example, as illustrated in FIGS. 1-8, grip 92 provides a contoured surface to aid a user in gripping transaction product 10. In one embodiment, grip 92 is formed from a separate piece of material as compared to a remainder of housing 12 and is coupled to housing 12 with any of adhesive, ultrasonic welding, friction fit, rivets, screws, etc.

Base 20 and/or cover 22 may additionally include other internal protrusions or inner walls 94 extending from a respective one of primary panels 24 and 70 toward an inside of housing 12. Each inner wall 94 is configured to facilitate placement and alignment of digital camera assembly 16 components relative to housing 12 as will become apparent upon reading the description below.

For example, cover 22 includes inner walls 94 defining a battery chamber 96 for selectively maintaining one or more batteries or other power supply 98. In one embodiment, upon assembly of base 20 and cover 22, cutout 50 and cutout 84 align with and abut one another to collectively define an access opening through housing 12 to battery chamber 96. Accordingly, one or more batteries or other components of power supply 98 can be slid through the opening and into battery chamber 96. In one example, housing 12 includes a door 100 coupled to one or both of base 20 and cover 22 and configured to selectively cover the opening defined by cutouts 50 and 84. Door 100 may slide, rotate, and/or otherwise move relative to or be removed entirely from a remainder of housing 12 to provide selective access to battery chamber 96.

In one example, housing 12 includes one or more of brand indicia 102 and redemption indicia, which is generally indicated by a dashed box at 104 in FIG. 3. Indicia 102 and 104 may be applied to housing 12 in any suitable manner such as with printing, with a printed label, via integral formation with housing 12, etc.

Brand indicia 102 identify a brand associated with transaction product 10 such as identifying a product brand, a store brand or other indicia readily associated with a product or store etc. In one embodiment, brand indicia 102 are included on one or both of primary panel 24 and primary panel 70.

In one embodiment, housing 12 includes redemption indicia 104, which, in one example, are included on outside surface 32 of primary panel 70. Redemption indicia 104 indicate that transaction product 10 is redeemable for the purchase of goods and/or services and that, upon use, a value of the goods and/or services will be deducted from the account or record linked to transaction product 10. In one embodiment, redemption indicia 104 include phrases such as "<NAME OF STORE> GiftCard" and "This GiftCard is redeemable for merchandise or services at any of our stores or at our web site," and/or provides help or phone line information in case of a lost, stolen or damaged transaction product, etc.

Figure 11:
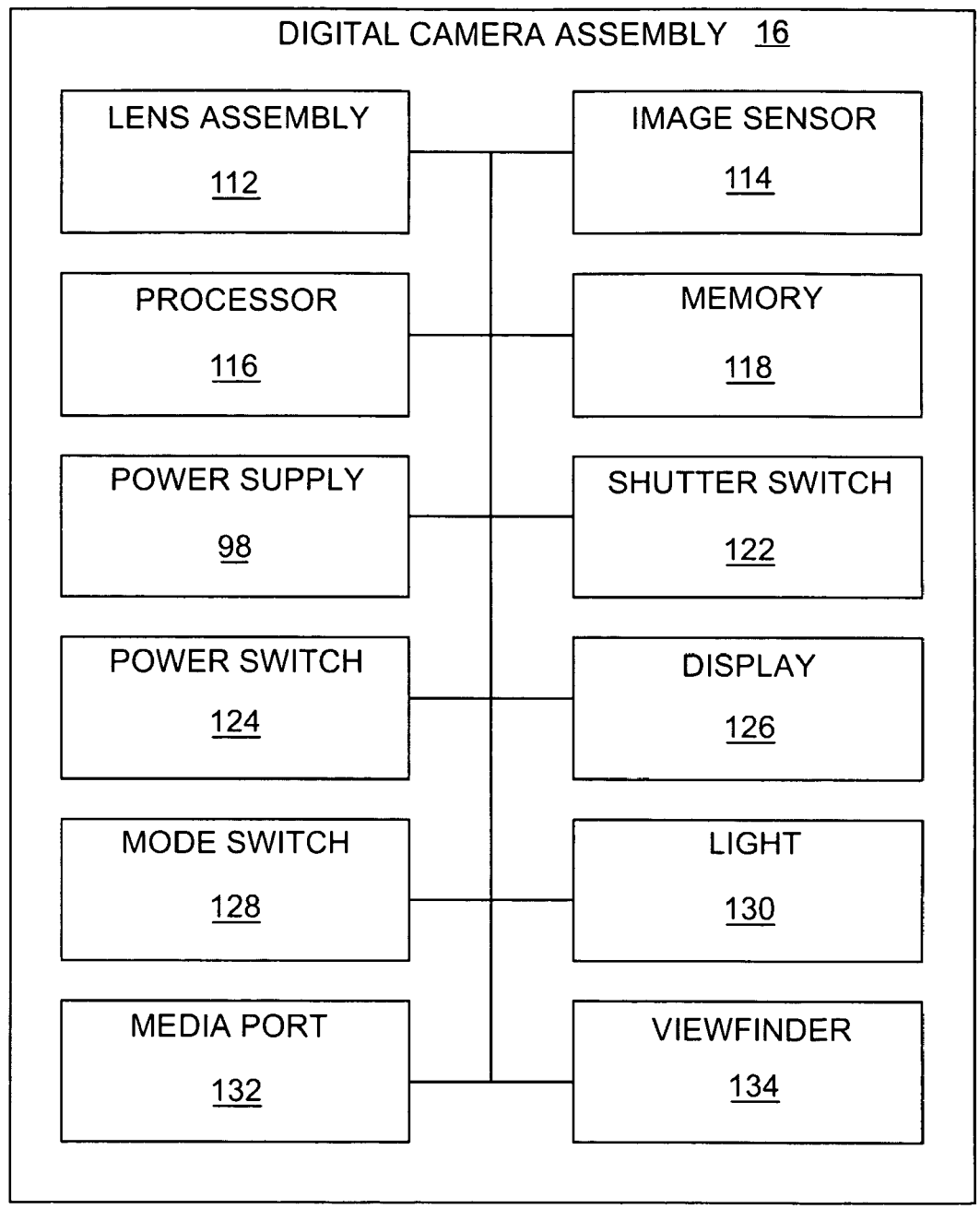
FIG. 11 is block diagram of a digital camera assembly of the transaction product of FIG. 1, according to one embodiment of the present invention.

Referring to the block diagram of FIG. 11 and the exploded, perspective view illustration of FIG. 8, in one embodiment, digital camera assembly 16 generally includes a lens assembly 112, an image sensor 114, a processor 116, a memory 118, power supply 98, a shutter switch 122, a power switch 124, a display 126, a mode switch 128, a light 130, a media port 132 and a viewfinder 134. In one example, lens assembly 112, image sensor 114, processor 116, memory 118, power supply 98, shutter switch 122, power switch 124, display 126, mode switch 128, light 130 and/or media port 132 are electrically coupled with (i.e., are in electrical communication with) one another directly or indirectly, for example, via attachment to a printed circuit board 136 (generally indicated in FIG. 8 with electrical traces (not shown) thereon.

Lens assembly 112 generally refers to any suitable lens assembly, which may include a suitable shutter mechanism (not shown) configured to facilitate image focusing, control exposure time and/or otherwise facilitate collection of light waves associated with an image. Lens assembly 112 is one example of means for receiving a visual image.

Image sensor 114 converts light waves received via lens assembly 112 into electrical charges that can be communicated to processor 116 (i.e., converts visual images into electrical picture data representing or other digital representations of the visual image). In one example, image sensor 114 includes one of a charge coupled device (CCD) and a complementary metal oxide semiconductor (CMOS). In one example where image sensor 114 includes a CCD, digital camera assembly 16 additionally includes an analog-to-digital converter configured to translate analog signals from the CCD to digital format before forwarding the signal to processor 116. Image sensor 114 may be of any suitable sensitivity that suits cost considerations for the particular transaction product 10 being produced. In one example, image sensor 114 is a 300,000 pixel CMOS sensor. In view of the above, image sensor 114 is one example of means for intaking a visual image and converting a visual image to a digital representation of the visual image.

Processor 116 is any suitable processor 116 configured to receive signals from image sensor 114 and to further process the signals, if necessary, and to otherwise drive overall function of digital camera assembly 16. In one embodiment, processor 116 writes signals directly from image sensor 114 and/or received from image sensor 114 and processed to memory 118. In one example, processor 116 converts digital signals from image sensor 114 into a desired file format such as JPEG, etc.

Memory 118 is any suitable memory such as read-only memory (ROM) (e.g., programmable ROM (PROM), erasable PROM (EPROM) and electrically EPROM (EEPROM)) and read-write memory (RAM) (e.g., static RAM (SRAM), dynamic RAM (DRAM) and synchronous dynamic random access memory (SDRAM)). Memory 118 can be configured to store any suitable amount of data depending upon the desired use and desired cost point of transaction product 10. In one example, memory 118 is configured to store about 25 pictures at 640×480 video graphics array (VGA) or about 100 pictures at 320×320 quarter video graphics array (QVGA). In one example, memory 118 is provided in the form of a memory card selectively removable from transaction product 10. Memory 118 is configured to store digital representations of visual images as created by the image sensor 114. As such, memory 118 is one example of means for storing digital representation of visual images.

Power supply 98 is any suitable source of power and, in one embodiment, is configured to be selectively maintained entirely within housing 12. For example, power supply 98 includes one or more batteries (see, e.g., FIG. 8) selectively received in battery chamber 96. For instance, in on embodiment, power supply 98 includes one or more readily removable and replaceable batteries such as alkaline or zinc-carbon batteries (e.g., two AAA alkaline batteries). In one embodiment, digital camera assembly 16 is configured to automatically enter into a power saving mode after a predefined period of time (e.g., thirty seconds) has passed without user interaction with digital camera assembly 16 of transaction product 10.

Shutter switch 122 communicates with lens assembly 112, for example, via processor 116, to activate digital camera assembly 16 to take a photograph and to control the amount of light allowed into lens assembly 112 upon use of digital camera assembly 16. As such, user interaction with shutter switch 122 (e.g., depression of shutter switch 122) activates digital camera assembly 16, or more specifically, image sensor 114 to intake light waves and generate electrical picture data (i.e., an electrical representation of an image) Power switch 124 controls whether or not power flows from power supply 98 to the other components of digital camera assembly 16 such that power switch 124 functions as an on/off switch.

Display 126 is any suitable display configured to facilitate user interaction with digital camera assembly 16 and may be as elaborate as desired and cost concerns allow. In one example, display 126 is a liquid crystal display (LCD) screen with a two-digit display and is configured to display alert or mode icons such as a low battery alert. In one example, display 126 is configured to indicate to the user the number of pictures saved to memory 118. Other displays 126 may include larger displays configure to provide photograph previews, etc. In one embodiment, display 126 is configured to fit at least partially through or to be viewable through aperture 42 formed in base 20 of housing 12.

Mode switch 128 allows a user to interact with digital camera assembly 16 to adjust the mode that digital camera assembly 16 is currently functioning in. For example, available modes may include one or more of regular single picture mode, self-timer mode, video mode, delete all mode, delete last photograph mode, change image resolution mode, light system shift mode, etc. Display 126 indicates to the user what mode digital camera assembly 16 is currently in. Pressing mode switch 128 allows a user to toggle through the various modes until display 126 indicates the desired mode. In one embodiment, mode switch extends to an external portion of housing 12 (e.g., base 20) through aperture 40 defined by primary panel 24 of base 20.

In one embodiment, digital camera assembly 16 includes indicator light 130. Indicator light 130 is configured to be externally viewed with respect to housing 12. In one embodiment, indicator light 130 fits at least partially through aperture 44 formed in base 20 of housing 12. Indicator light 130 is configured to be selectively lit to communicate with the user of digital camera assembly 16. In one embodiment, indicator light 156 is a light emitting diode (LED) and is configured to be continuously or intermittently lit when digital camera assembly 16 is on (i.e., when power is being supplied by power supply 98) and/or when memory 118 is being accessed. Other configurations of light 130 and illumination thereof are also contemplated.

Referring to FIGS. 8 and 11, media port 132 is any suitable port configured to facilitate communication between digital camera assembly 16 and a separate computing device (not shown) such as the user's personal home computer, personal digital assistant (PDA), cell phone, printer, etc. In one embodiment, media port 132 is a socket configured to receive a first connector 150 of connection cable 152 (FIG. 12) provided with transaction product 10. For example, media port 132 is in direct or indirect communication with processor 116 and is positioned to be externally accessible with respect to housing 12. In one example, at least a portion of media port 132 is accessible via an aperture collectively defined by cut-outs 56 and 90 respectively defined by base 20 and cover 22 of housing 12 such that first connector 150 of connection cable 152 can be selectively plugged into media port 132 from a location external to housing 12. For example, media port 132 is configured to receive a standardized communication cable such as a universal serial bus (USB) cable. In view of the above, media port 132 alone or with connection cable 152 is an example of means for selectively interfacing with a computing device separate from transaction product 10.

In one embodiment, connection cable 152 includes standardized connectors, for example, universal serial bus (USB) type connectors such as an A-type, B-type or mini-type USB plug connector. For example, first connector 150 is mini B-type USB plug connector configured to selectively interface with media port 132 of transaction product 10, and second connector 154 is an A-type USB plug connector for selectively electrically coupling with corresponding socket of a separate computing device such as a printer, computer, etc. (not shown). However, other combinations of types of connection cables 152 and connectors 150 and 154. In view of the above, media port 132 is one example of means for selectively coupling transaction product 10 with the separate computing device.

In this manner, when second connector 154 (FIG. 12) of connection cable 152 is plugged into a computing device, processor 116 and the computing device are configured to communicate with one another. In one embodiment, media port 132 may be any other suitable port to facilitate such communication. For example, media port 132 may include a connection cable partially housed by or otherwise connected to housing 12, may be a port configured to wirelessly communicate with the computing device eliminating connection cable 152, etc. In one embodiment, since media port 132 is configured to export and/or import digital photograph and/or video files from the computing device, transaction product 10 is characterized by an absence of any analog signal input devices.

Viewfinder 134 is any suitable see-through device configured to provide the user with an approximate view of what will be captured by image sensor 114 when shutter switch 122 is pressed or otherwise activated as will be apparent to those of skill in the art upon reading this application. In one embodiment, viewfinder 134 includes one or more clear lenses configured to collectively indicate a view indicative of what image will be captured. Viewfinder 134 is positioned within housing 12 between aperture 46 (FIG. 9) of base 20 and aperture 80 of cover 22 such that aperture 46, viewfinder 134 and aperture 80 all linearly align allowing the user to look straight through each of aperture 46, viewfinder 134 and aperture 80 substantially simultaneously. In view of the above, viewfinder 134 is one example of means for viewing a visual image. Although described as being part of digital camera assembly 16, in one example, viewfinder 134 is not electrically or otherwise directly coupled to digital camera assembly 16 such that it may be considered a component of transaction product 10 separate from digital camera assembly 16. Other variations and embodiments of digital camera assembly 16 will be apparent to those of skill in the art upon reading this application.

Figure 12:
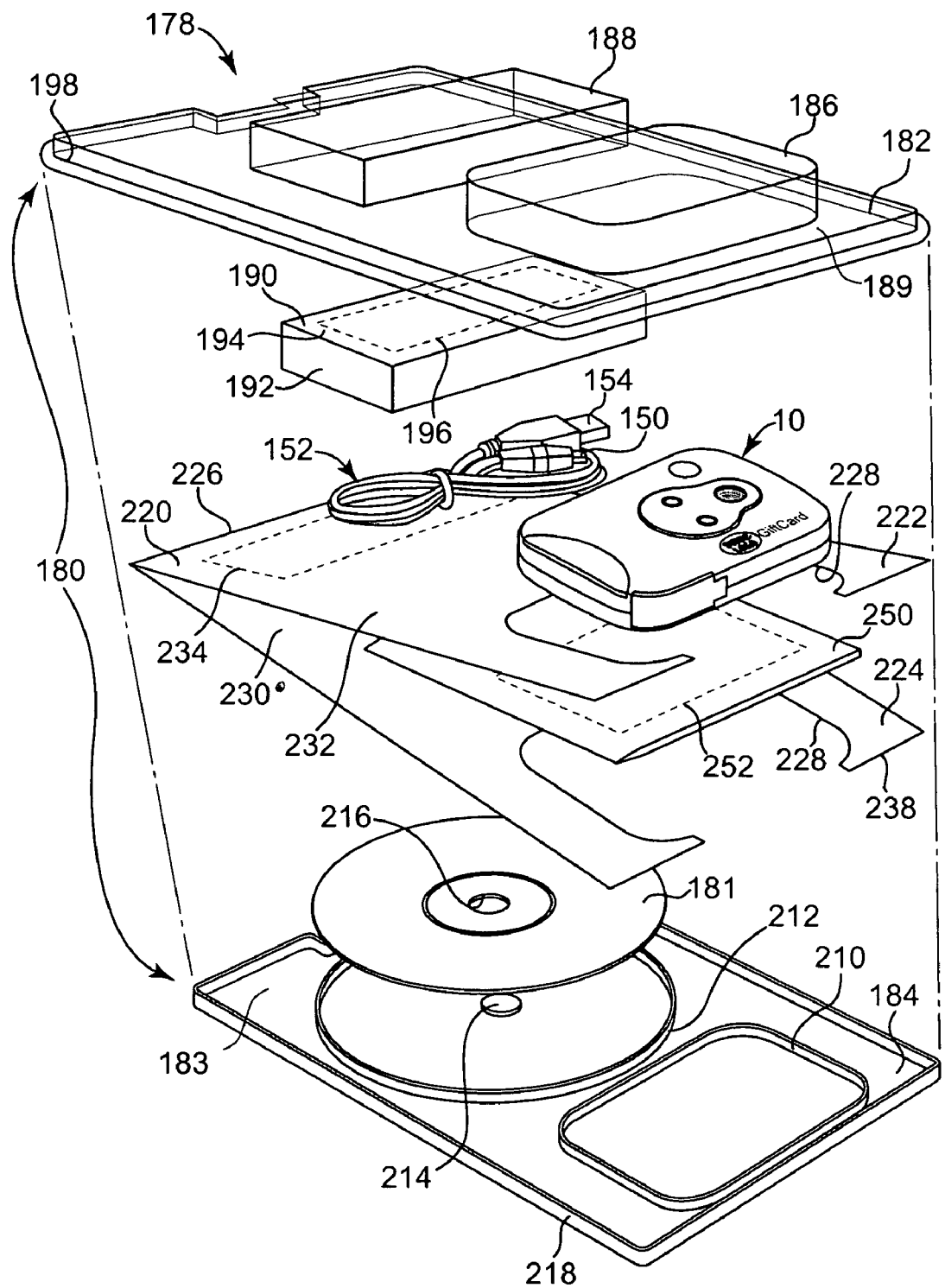
FIG. 12 is an exploded top perspective view illustrating a packaged assembly including the transaction product of FIG. 1, according to one embodiment of the present invention.

FIG. 12 illustrates one embodiment of a packaged assembly 178 including transaction product 10 (e.g., a packaged transaction product). In particular, packaged assembly 178 includes package 180, a compact disc 181, connection cable 152 and transaction product 10. As illustrated, package 180 is a blister or clam shell package, however, one of skill in the art will recognize other suitable packages upon reading this application. In one example, package 180 includes a first or top member 182 and a second or bottom member 184 configured to be coupled to one another about their perimeters in a manner enclosing compact disc 181, connection cable 152 and transaction product 10 therebetween. In one embodiment, package 180 is translucent or transparent such that items contained therein can generally be seen through package 180 while packaged assembly 178 is on display in a retail setting.

In one embodiment, top member 182 defines a first or product chamber 186 and a separate second or box chamber 188 extending upward from a generally planar panel 189 of top member 182 as described with respect to the orientation illustrated in FIG. 12. Product chamber 186 is sized with an outer perimeter slightly larger than an outer perimeter of transaction product 10 such that transaction product 10 substantially fits within chamber 186.

Box chamber 188 is sized to receive a box 190. Box 190 is sized to receive and/or cover connection cable 152 when packaged for retail sale and, in one embodiment, is open toward bottom member 184 of package 180. Box 190 defines a side wall 192 extending around a perimeter of top wall 194. Side wall and top wall 194 are sized to fit snuggly within box chamber 188. In one embodiment, indicia 196, which are generally indicated in FIG. 12 with a dashed box for clarity, include promotional information, loading information, value information, etc. In one example, indicia 196 indicate that a predetermined value is associated with transaction product 10 or that a minimum load amount is required to activate transaction product 10 (e.g., a minimum $50 load is required to offset larger costs associated with transaction product 10 as compared to conventional, substantially flat gift cards, etc.). Indicia 196 may alternatively or additionally indicate or advertise components included in packaged assembly 178.

A perimeter rim 198 extends around the perimeter of planar panel 189 and is configured to interface with bottom member 184 of package 180. More specifically, in one example, bottom member 184 defines a substantially planar panel 183 with a perimeter rim 218 extending around a substantial entirety thereof. Rim 218 interfaces with rim 198 and/or may be coupled to each other with crimping, heat, adhesive, etc. to interpose transaction product 10, compact disc 181 and connection cable 152 between top member 182 and bottom member 184.

In one embodiment, bottom member 184 defines a raised lip 210 extending upwardly from planar panel 189 and sized with an outer perimeter just slightly smaller that inside perimeter of product chamber 186. As such, when bottom member 184 is coupled with top member 182, lip 210 fits just inside a lower portion of product camber 186 substantially enclosing transaction product 10 and maintaining transaction product 10 in place within product chamber 186.

In one example, bottom member 184 defines a reception area for receiving compact disc 181 defined by a flange 212, which extends upwardly from planar panel 183 and is sized with an inside perimeter just larger than an outside perimeter of compact disc 181. In one embodiment, a button or retaining hub 214 upwardly extends from planar panel 183 and is configured to be received by a hole 216 in the center of compact disc 181 to further facilitate selectively maintaining compact disc 181 within flange 212. More specifically, in one embodiment, retaining hub 214 is sized with a diameter slightly greater than hole 216 and is configured to flex radially inward to be received by hole 216 when compact disc 181 is moved toward planar panel 183. Once compact disc 181 is in place, retaining hub 214 flexes back out to securely maintain compact disc 181 in place relative thereto.

Figure 13:
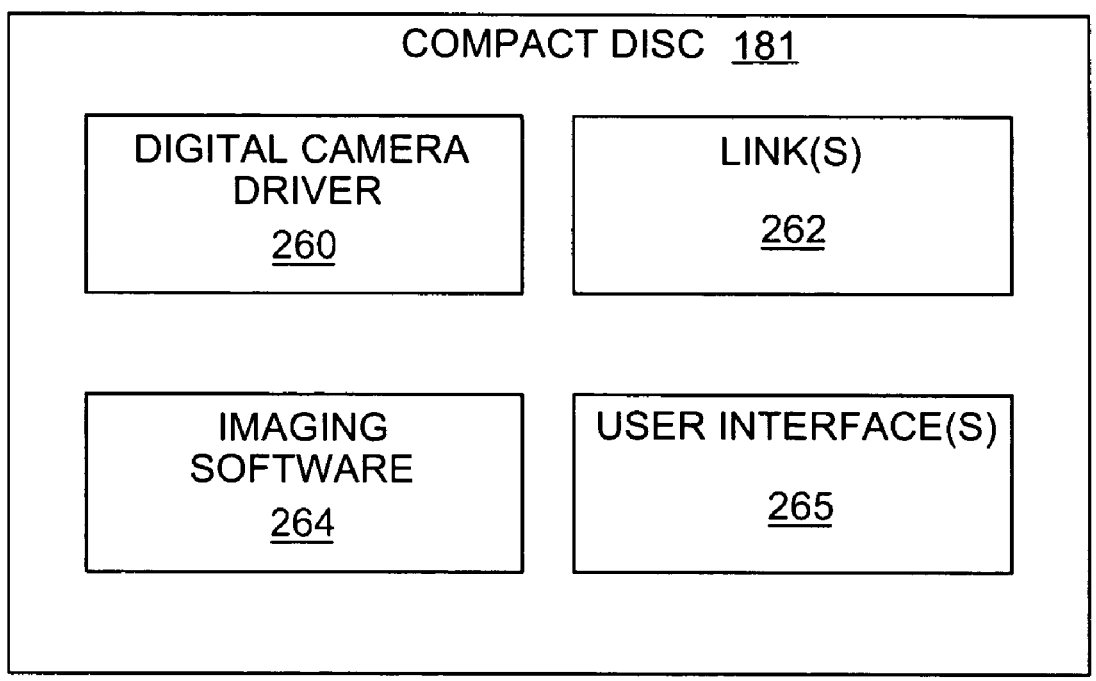
FIG. 13 is a block diagram of content included on a compact disc of the packaged assembly of FIG. 12, according to one embodiment of the present invention.

In one embodiment, compact disc 181 includes content configured to facilitate use of transaction product 10 as a digital camera and transferring of photographs between memory 118 of transaction product 10 and a separate computing device and/or to otherwise facilitate consumer enjoyment of photographs captured by transaction product 10. For example, as generally illustrated in FIG. 13, compact disc 181 includes content such as a digital camera driver 260, one or more links 262, imaging software 264 and user interfaces 265 or at least definitions thereof.

Digital camera driver 260 includes information configured to be downloaded to a user's computer or other device to facilitate communication with transaction product 10 via the computer, for example, to facilitate downloading photographs from memory 118 of transaction product 10 to the user's computer. Links 262 provide one or more address pointers for accessing web sites via the Internet. In one embodiment, links 262 include one or more link associated with a photograph processing web site, for example a photograph processing web site related to or provided by the retail store selling transaction product 10.

Imaging software 264 can be accessed by and/or downloaded to the user's computer and provides software for allowing manipulation or viewing of images transferred from memory 118 to the computer. For example, image software 264 is configured to facilitate a user in viewing, saving, changing resolutions, cropping, etc. of photographs captured by transaction product 10 and downloaded to the user's computer. Compact disc 181 may also include various user interfaces 265, which facilitate a user in communicating with transaction product 10 via the user's computer and connection cable 152.

In one embodiment, a backer or insert 220 is also enclosed within package 180. In one example, insert 220 is formed from a planar member defining a first or top panel 222 and a second or bottom panel 224 separated by a fold line 226. More particularly, insert 220 is folded along fold line 226 such that first or inside surfaces 230 defined by top panel 222 and bottom panel 224 are folded toward one another leaving second or external surface 232 of panels 222 and 224 viewable through package 180. Top panel 222 and bottom panel 224 are similarly sized and shaped such that when insert 220 is folded along fold line 226, the two panels 222 and 224 are substantially coextensive. Folded insert 220, in one example, is sized substantially similarly to planar panels 183 and 189 of package 180 such that an outer perimeter 238 of insert 220 substantially abuts and is substantially coextensive with perimeter rims 198 and 218.

In one embodiment, insert 220 includes a cutout 228 separately defined by each of top panel 222 and bottom panel 224. Cutout 228 is sized similarly to, but slightly larger than lip 210 such that when insert 220 is placed in package 180, cutout 228 aligns with and extends around an outer perimeter of lip 210. In this manner, transaction product 10 can be viewed through package 180 from a top of package 180 (i.e., through planar panel 189) and through a bottom of package 180 (i.e., through planar panel 183) and is not blocked or covered by insert 220. In one example, account identifier 14 (FIG. 3) of transaction product 10 is scannable or otherwise machine readable through planar panel 183 when being processed at the point-of-sale of the retail setting such as where account identifier 14 includes a bar code.

In one embodiment, insert 220 includes indicia 234, generally indicated with a dashed box for clarity. Indicia 234 may include any one or more of brand indicia, redemption indicia, promotional indicia, instructional indicia or other suitable identifiers as will be apparent to those of skill in the art upon reading this application. Although illustrated as a single rectangle, it should be understood that indicia 234 may be included anywhere on insert 220 (e.g., on top panel 222, bottom panel 224, inside surfaces 230 or external surface 232).

In one example, instructional or directional booklet 250 and/or other pamphlet(s), sheet(s), etc. are interposed between top panel 222 and bottom panel 224 of insert 220. Directional booklet 250 includes directions, which are generally indicated by dashed box 252, instructing the user how to use transaction product 10 as a digital camera (e.g., how to install batteries, how to take pictures, how to turn transaction product 10 on and off, how to use the self-timer, how to shift between video and photograph modes, how to take a 3-photograph continuous shoot, how to delete photographs and/or how to change image resolution). Directional booklet 250 may also include instructions for using compact disc 181, downloading photographs, etc. In one embodiment, directional booklet 250, insert 220 or other item placed in package 180 provides the user with a coupon for g photography processing services provided by an entity such as an entity that is or is associated with the retail store offering packaged assembly 178 for sale. Other indicia may alternatively or additionally be included on any suitable portion of packaged assembly 178 as will be apparent to those of skill in the art upon reading this application.

Figure 14:
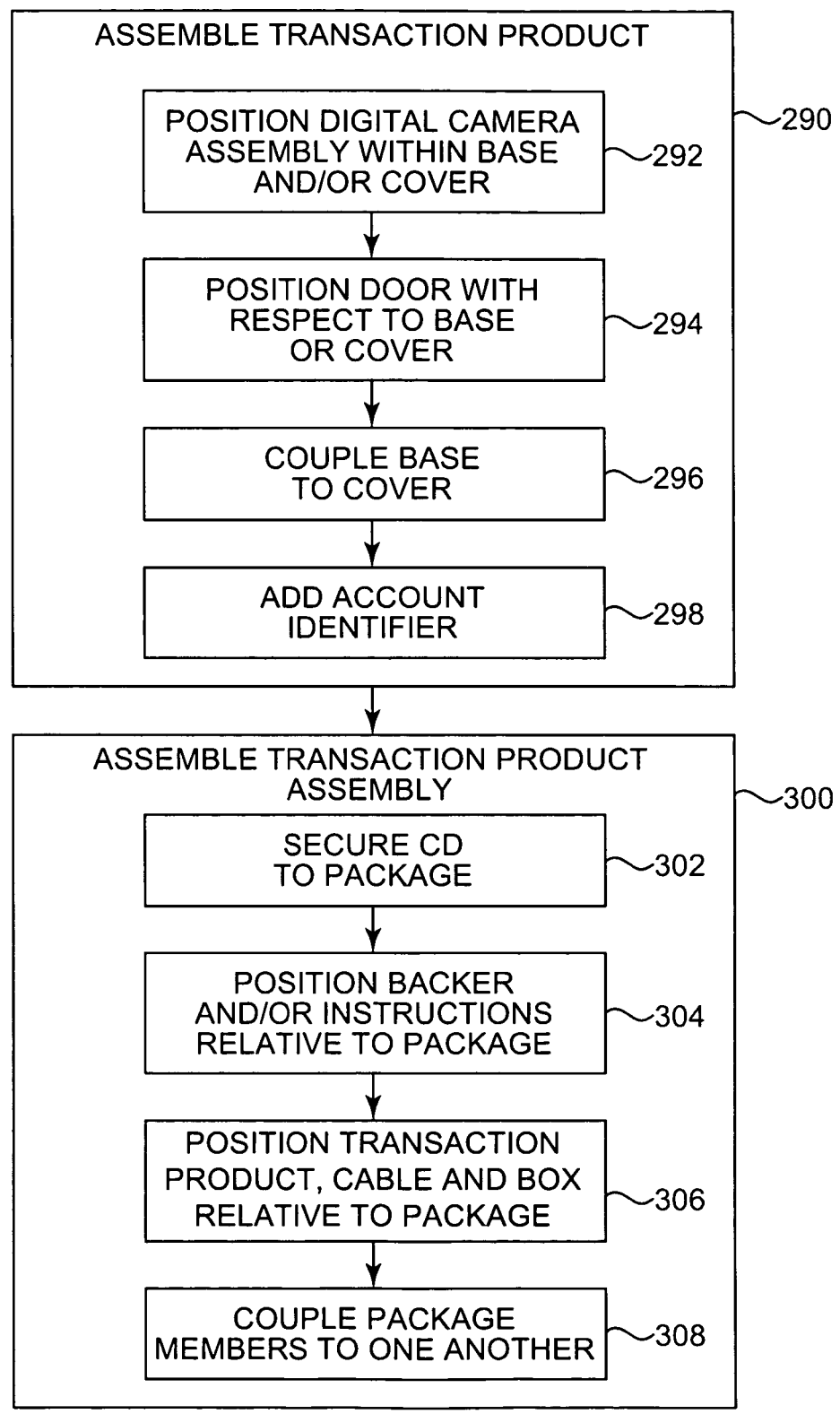
FIG. 14 is a flow chart illustrating a method of assembling the packaged assembly of FIG. 13, according to one embodiment of the present invention.

FIG. 14 is a flow chart illustrating one embodiment of a method 290 of assembling packaged assembly 178 (i.e., a transaction product assembly) as described with additional reference to FIGS. 1-8. At 290, transaction product 10 is assembled. More specifically, at 292, digital camera assembly 16 is positioned within housing 12. In one embodiment, digital camera assembly 16 is initially positioned within base 20. For example, printed circuit board 136 with components attached thereto is positioned in base 20 such that mode switch 128 (which may be provided with a collar to facilitate coupling to base 20) is positioned within aperture 40. In one example, display 126, light 130 and viewfinder 134 align with and are viewable through apertures 42, 44 and 46, respectively. In one embodiment, shutter switch 122, power switch and media port 132 nest at least partially within cutouts 50, 52 and 56, respectively. Lens assembly 112 and viewfinder 134 are positioned within base 20 so that they will align with aperture 80 and aperture 78 of cover 22 upon final assembly.

At 294, door 100 is coupled with housing 12, for example, within cutout 54 of base 20. Door 100 may be coupled to base 20 in any suitable manner such as rotatably, slidably and/or removably. Once transaction product 10 is fully assembled, door 100 is configured to be readily movable with respect to a remainder of housing 12 to selectively cover and uncover an opening to battery chamber 96 to allow batteries to be removed and replaced from battery chamber 96. In one example, door 100 is configured to be moved with respect to the remainder of housing 12 and resecured in a closed positioned with respect to the remainder of housing 12 all without the use of tools.

At 296, cover 22 is coupled with base 20 or vice versa. In one embodiment, cover 22 is placed on base 20 such that apertures 80 and 78 align with viewfinder 134 and lens assembly 112, respectively, and cutouts 84, 86 and 90 align with and at least partially fit around shutter switch 122, power switch 124 and media port 132. When cover 22 and base 20 are coupled to one another, in one embodiment, door 100 is positioned therebetween and coupled with one or both of base 20 and cover 22 between cutouts 54 and 88.

Base 20 and cover 22 align such that edge 34 and edge 82 abut one another, and in one embodiment, tabs 83 of cover 22 each fit within in one of holes 38 of protrusions 36 included on base 20. Base 20 and cover 22 may be further secured to each other with attachment devices (screws, rivets, etc.), adhesive, ultrasonic welding and/or any other suitable coupling means.

At 298, account identifier 14 is added to transaction product 10 in cases where account identifier 14 was not otherwise formed or added to base 20 and/or cover 22 at a previous step or enclosed between base 20 and cover 22 during coupling at 296. For example, at 298, account identifier 14 may be printed or otherwise applied to one or both of primary panel 24 and primary panel 70 after coupling base 20 to cover 22 at 298. In one embodiment, account identifier 14 is added to transaction product 10 before one or more of operations 292, 295 and 296.

Once transaction product 10 is assembled, then at 300, package assembly 178 is formed. More specifically, at 302, compact disc 181, if included, is positioned within and/or secured to package 180, for example, within flange 212 and secured to retaining hub 214, which extends through hole 216 of compact disc 181. At 304, insert 202 and/or directional booklet 250 are placed in package 180, for instance, on top of planar panel 183 of package 180 and over compact disc 181. In one embodiment, insert 202 is folded, directional booklet 250 is placed between top panel 222 and bottom panel 224, and insert 202 is placed over planar panel 183 such that outer perimeter 238 of insert 220 aligns with and coextends along a substantial entirety of rim 218. Cutout 228 of insert 202 fits around lip 210 of bottom member 184.

At 306, transaction product 10 is placed in an area defined by lip 210 and/or cable 152 is placed in box 190 and placed on insert 220 in a position that will align with box chamber 188. Finally, at 308, top member 182 and bottom member 184 of package 180 are coupled to one another, for example, rim 198 to rim 218, enclosing transaction product 10, insert 220, directional booklet 250, cable 152 and box 190 therebetween. Once assembled, box 190 fits within box chamber 188, and transaction product 10 fits and is securely maintained within product chamber 186. Other methods and items for forming packaged assembly 178 are also contemplated and will be apparent to those of skill in the art upon reading the present application.

Figure 15:
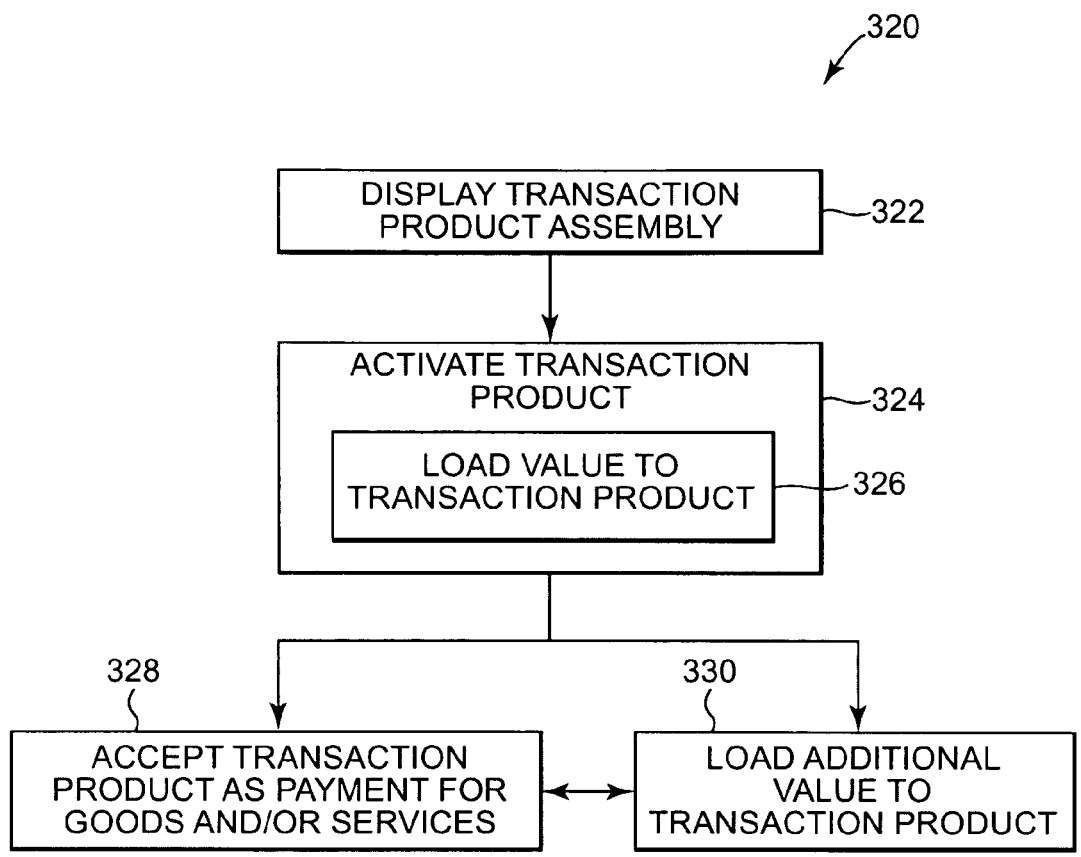
FIG. 15 is a flow chart illustrating a method of encouraging purchase and facilitating use of a transaction product, according to one embodiment of the present invention.

FIG. 15 is a flow chart illustrating one embodiment of a method 320 of providing and supporting use of transaction product 10. At 322, transaction product 10 is displayed to potential consumers. For example, packaged assembly 178, which includes transaction product 10, is placed on or hung from a rack, shelf or similar device to display packaged assembly 178 in a retail setting such that transaction product 10 is visible to potential consumers. In one embodiment, transaction product 10 is displayed alone without compact disc 181 and/or a depiction of transaction product 10 is placed on a web site for viewing and purchase by potential consumers.

At 324, a consumer, who has decided to purchase transaction product 10, presents packaged assembly 178, or at least transaction product 10, to a retail store employee, retail store kiosk or other person or device to scan or otherwise read account identifier 14 of transaction product 10 (e.g., through package 180) to access the account or record linked to account identifier 14. Upon accessing the account or record, value is added to the account or record at 326. Thus, transaction product 10 is activated and loaded. In one embodiment, wherein a value is associated with transaction product 10 prior to purchase and activation of transaction product 10, operation 326 may be eliminated and activating transaction product 10 at 324 serves to unlock the account or record or otherwise make the predetermined value in the account or record available to a bearer of transaction product 10.

Once transaction product 10 is activated and/or loaded, transaction product 10 can be used by the consumer or any other bearer of transaction product 10 toward the purchase or use of goods and/or services at the retail store or other affiliated retail setting or web site. In one embodiment, where transaction product 10 is displayed on a web site at 322, then, at 324, transaction product 10 may be activated in any suitable method and may be completed without machine scanning of account identifier 14. In one embodiment, transaction product 10 is activated and/or loaded remotely via a telephone or the Internet.

At 328, the retail store or other affiliated retail setting, web site, etc. accepts transaction product 10 as payment toward the purchase or use of goods and/or services made by the current bearer of transaction product 10. More specifically, in one embodiment, the value currently loaded on transaction product 10 is applied toward the purchase of goods and/or services, toward the use of calling minutes, etc. At 330, additional value is optionally loaded on transaction product 10 at a point-of-sale terminal, kiosk, other area of the retail store or related setting or via a web site or by telephone. Upon accepting transaction product 10 as payment at 328, the retail store or related setting can subsequently perform either operation 328 again or operation 330 as requested by a current bearer of transaction product 10. Similarly, upon loading additional value to transaction product 10 at 330, the retail store or related setting can subsequently perform either operation 330 again or operation 328. In one example, the ability to accept transaction product 10 as payment for or toward use of goods and/or services is limited by whether the account or record associated with transaction product 10 has any value at the time of attempted redemption.

Figure 16:
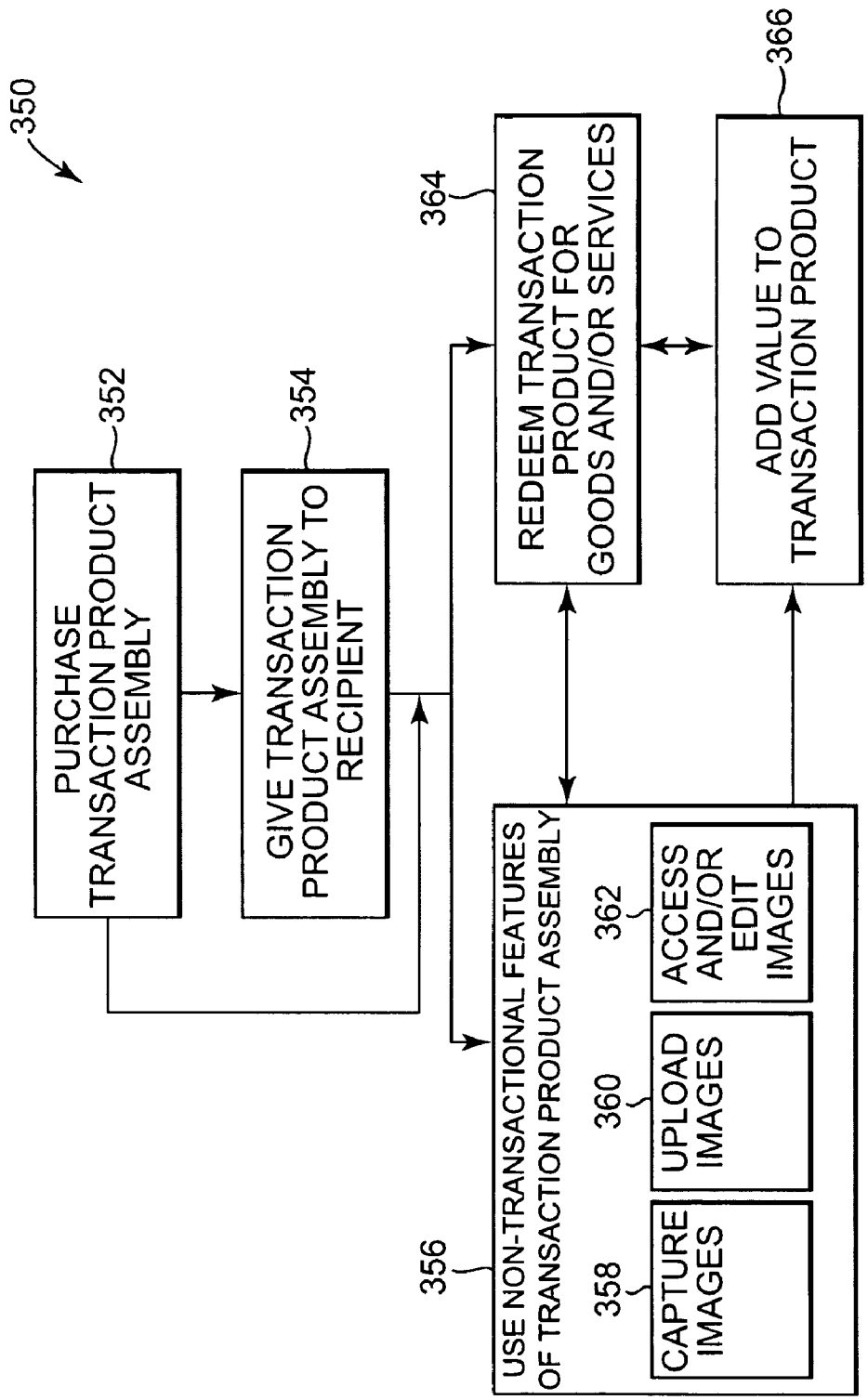
FIG. 16 is a flow chart illustrating a method of using a transaction product, according to one embodiment of the present invention.

FIG. 16 is a flow chart illustrating one embodiment of a method 350 of using transaction product 10. At 354, a potential consumer of transaction product 10, which is displayed in a retail store or viewed on a web site, decides to and does purchase transaction product 10 from the retail store or web site setting. Transaction product 10 can be displayed and purchased alone or as part of packaged assembly 178. Upon purchasing transaction product 10, a retail store employee, retail store kiosk or other person scans account identifier 14 to activate and/or load value onto transaction product 10. In one embodiment, such as where transaction product 10 is purchased at 352 via a web site, actual scanning of account identifier 14 may be eliminated.

At 354, the consumer optionally gives transaction product 10 to a recipient, such as a graduate, relative, friend, expectant parents, one having a recent or impending birthday, a couple having a recent or impending anniversary, etc. In one embodiment, a plurality of transaction products 10 are purchased and given to party goers, such as at a birthday party, bridal shower, etc. as party favors or gifts. As an alternative, the consumer can keep transaction product 10 for his or her own use thereby eliminating operation 354.

At 356, the consumer or recipient, whoever is in current ownership or otherwise is the current bearer of transaction product 10, uses transaction product 10 for reasons unrelated to its stored-value or transactional features. More specifically, the bearer uses transaction product 10 as a digital camera. For example, at 358, the card bearer uses transaction product 10 to capture digital images as will be apparent to those of skill in the art upon reading the present application. At 360, digital images are uploaded from transaction product 360 to a separate computing device using, for example, connection cable 152. Once digital images are stored to the separate computing device, the card bearer or other individual can access, view and/or edit the images on the computing device, using for example, digital camera driver 260 and/or imaging software 264 previously downloaded to the separate computer from compact disc 181.

At 364, the current bearer of transaction product 10 redeems transaction product 10 for goods and/or services from the retail store or web site. Operation 364 may occur before, after or before and after operation 356. At 366, the current bearer of transaction product 10 optionally adds value to transaction product 10 or, more particularly, to the account or record associated with transaction product 10, at the retail store, over the Internet or via telephone. Upon using the non-transactional functionality (i.e., digital camera functionality) of transaction product 10 at 356, redeeming transaction product 10 at 364 or adding value to transaction product 10 at 366, the current bearer of transaction product 10 subsequently can perform any of operations 356, 364 or 366 as desired. In one embodiment, the ability of the current bearer to repeat redeeming transaction product 10 at 364 is limited by whether the account or record associated with transaction product 10 has any value at the time of attempted redemption.

Although primarily described above as occurring at single retail store or web site, in one embodiment, purchasing transaction product 10 at 352, redeeming transaction product 10 at 364 and adding value to transaction product 10 at 366, can each be performed at any one of a number of stores adapted to accept transaction product 10 or over the Internet. In one example, the number of stores are each a part of a chain of similarly branded stores. In one example, the number of stores includes at least one web site and/or at least one conventional brick and mortar store.

Stored-value cards and other transaction products come in many forms, according to embodiments of the invention. The gift card or phone card, like other stored-value cards, generally can be "recharged" or "reloaded" at the direction of the original consumer, the gift recipient or third party. The term "loading on" or "loaded on" herein should be interpreted to include adding to the balance of an account or record associated with a stored-value card. The balance associated with a stored-value card declines as the card is used, encouraging repeat visits. The card remains in the user's purse or wallet, serving as an advertisement or reminder to revisit the associated merchant. Transaction products, according to an embodiment of the invention, provide a number of advantages to both the consumer and the merchant. Other transaction products according to embodiments of the invention include loyalty cards, merchandise return cards, electronic gift certificates, employee cards, frequency cards, pre-paid cards and other types of cards associated with or representing purchasing power or monetary value, for example.

Although the invention has been described to particular embodiments, such embodiments are for illustrative purposes only and should not be considered to limit the invention. Various alternatives and modifications within the scope of the invention in its various embodiments will be apparent to those with ordinary skill in the art.

What is claimed is:

1. A transaction product comprising:
   a digital camera assembly including:
      a lens assembly,
      an image sensor aligned with the lens assembly, and
      a memory electrically coupled with the image sensor,
         wherein the digital camera assembly is configured to capture images through the lens assembly using the image sensor and to digitally store the captured images to the memory;
   a housing substantially enclosing the image sensor and the memory, the housing including a base and a cover, the base having a first substantially planar panel including a top half and a bottom half, the top half including apertures formed only through the top half of the first substantially planar panel; and
   an account identifier formed on the bottom half of the first substantially planar panel of the housing linking the transaction product to an account or record, the account identifier being machine readable by a point-of-sale terminal such that value can be added to or deducted from the account or record using the account identifier.

2. The transaction product of claim 1, wherein the account identifier includes at least one of a bar code, a magnetic strip, an electronic device and a radio frequency identification device.

3. The transaction product of claim 1, wherein the digital camera assembly includes a media port in electrical communication with the memory and configured to selectively receive a connector in a manner permitting the captured images to be exported from the memory via the connector.

4. The transaction product of claim 1, wherein the image sensor includes a complementary metal oxide semiconductor (CMOS).

5. The transaction product of claim 1, wherein the base and the cover are coupled to one another to enclose the lens assembly and the image sensor therebetween.

6. The transaction product of claim 1, wherein the digital camera assembly includes a display screen and is configured to function in a plurality of modes, and the digital camera assembly is configured to indicate a current one of the plurality of modes on the display screen.

7. The transaction product of claim 6, wherein the digital camera assembly includes a mode switch that is at least partially accessible from a position external to the housing, wherein when a user interacts with the mode switch, the digital camera assembly is configured to change which one of the plurality of modes is the current one of the plurality of modes.

8. The transaction product of claim 1, wherein the housing defines a side wall extending between the first substantially planar panel and a second substantially planar panel spaced from the first substantially planar panel, the second substantially planar panel is included on the cover, wherein a shutter switch extends through the side wall of the housing and is electrically coupled to the image sensor.

9. The transaction product of claim 8, wherein the transaction product includes a viewfinder extending between and visually aligned with apertures formed in the top half of the first substantially planar panel and the second substantially planar panel such that a user can look through the viewfinder and the apertures substantially simultaneously.

10. The transaction product of claim 8, wherein the transaction product includes a display screen viewable through one of the first substantially planar panel and the second substantially planar panel.

11. The transaction product of claim 1, wherein the housing includes a movable door selectively extending over an access opening to a battery cavity configured to selectively receive one or more batteries.

12. The transaction product of claim 11, wherein the housing includes a second substantially planar panel spaced from and parallel to the first substantially planar panel, and a side wall extending between the first substantially planar panel and the second substantially planar panel, the side wall defining the access opening.

13. The transaction product of claim 1, in combination with a compact disc and a package supporting the transaction product and the compact disc, the compact disc including at least one software component selected from a group including a driver for the digital camera assembly and an image viewing software.

14. The transaction product of claim 1, in combination with a package and a connection cable, wherein the digital camera assembly includes a media port configured to selectively receive an end of the connection cable such that the captured images can be exported from the digital camera assembly via the connection cable.

15. The combination of claim 14, wherein the package includes a first chamber for receiving the transaction product and a second chamber spaced from the first chamber for receiving the connection cable.

16. The combination of claim 15, wherein the package includes a retaining hub selectively securing a compact disc to the package.

17. The combination of claim 16, wherein the package includes two panels, and the transaction product, the connection cable and the compact disc are each maintained between the two panels.

18. The combination of claim 17, wherein an insert including one or both of a coupon and instructional information is maintained between the two panels.

19. A transaction product comprising:
  a digital camera assembly including:
    a printed circuit board including:
      a lens assembly,
      an image sensor aligned with the lens assembly, and
      a memory electrically coupled with the image sensor,
    wherein the digital camera assembly is configured to capture images through the lens assembly using the image sensor and to digitally store the captured images to the memory, and the lens assembly, the image sensor, and the memory are attached to the printed circuit board;
  a housing substantially enclosing the image sensor and the memory, the housing including a base and a cover, the printed circuit board disposed between the base and the cover; and
  an account identifier formed on the base of the housing linking the transaction product to an account or record, the account identifier being machine readable by a point-of-sale terminal such that value can be added to or deducted from the account or record using the account identifier,
wherein:
  the base of the housing has a substantially planar panel including a top half and a bottom half,
  the housing includes apertures formed only through the top half of the substantially planar panel, and
  the account identifier is formed on the bottom half of the substantially planar panel of the housing.

* * * * *